United States Patent [19]

Hayashi

[11] Patent Number: 5,110,277
[45] Date of Patent: May 5, 1992

[54] DOUGH-STRETCHING ROLLER APPARATUS

[75] Inventor: Torahiko Hayashi, Utsunomiya, Japan

[73] Assignee: Rheon Automatic Machinery Co., Ltd., Utsunomiya, Japan

[21] Appl. No.: 643,976

[22] Filed: Jan. 22, 1991

[30] Foreign Application Priority Data

Feb. 16, 1990 [JP] Japan ............... 2-36725

[51] Int. Cl.⁵ .............................. B29C 55/18
[52] U.S. Cl. .................. 425/141; 264/290.2; 264/291; 425/363; 426/517
[58] Field of Search ............. 264/175, 288.4, 290.2, 264/291, 40.1, 40.7, DIG. 73; 425/141, 363, 367, 368, DIG. 53, 140; 426/517

[56] References Cited

U.S. PATENT DOCUMENTS

| | | | |
|---|---|---|---|
| 3,084,314 | 4/1963 | Ziffer | 425/367 |
| 3,402,681 | 9/1968 | Mandikian et al. | 425/367 |
| 3,635,627 | 1/1972 | Palmer | 425/141 |
| 4,111,626 | 9/1978 | Funakoshi et al. | 425/141 |
| 4,276,317 | 6/1981 | Hayashi | 426/517 |
| 4,770,619 | 9/1988 | Rijkaart | 426/517 |
| 4,880,371 | 11/1989 | Spinelli et al. | 425/141 |
| 4,957,426 | 9/1990 | Hayashi | 425/367 |

*Primary Examiner*—Jay H. Woo
*Assistant Examiner*—Khanh P. Nguyen
*Attorney, Agent, or Firm*—Guy W. Shoup; David W. Heid

[57] ABSTRACT

A dough-stretching roller apparatus is provided to produce a continuous web of dough in a process to manufacture confectionery and bread. The apparatus includes a pair of upper rollers, a sensor means that detects the width of dough at the gap between the upper rollers, and a controller that controls a motor driving the upper rollers in response to a signal from the sensor means. The controller decreases the rotational speed of the upper rollers when the sensors detect that the width of dough is broader than a predetermined width of dough passing through the upper rollers, while the controller increases the rotational speed of the upper rollers when the sensors detect that the width of dough is narrower than the predetermined width of the dough passing through the upper rollers. Thus, even if the amount of dough supplied from a hopper is unstable, production of a stretched web of dough having a constant volume per unit length can be stably continued.

6 Claims, 4 Drawing Sheets

DOUGH-STRETCHING ROLLER APPARATUS

BACKGROUND OF THE INVENTION

1. Field of the Invention

This invention relates to a dough-stretching roller apparatus which is used to produce a continuous web of dough, in a process to manufacture confectionery and bread. Especially, the apparatus includes a computer memory into which the desired production rate, width, and thickness of the web of dough are previously stored, so that a mass of dough supplied from a hopper can be stretched into a uniform and continous web of dough, and so that a web of dough of a constant volume can be fed to a following production line.

2. Prior Art

FIGS. 5 and 6 show two examples of a dough-stretching roller apparatus of the prior art. The apparatus in FIG. 5 includes a pair of cylindrical rollers 53 disposed opposite each other. When dough is fed into the gap between the rollers 53 from a dough hopper 52 that is located above the rollers 53, the mass of dough is stretched by the rollers 53 into a wed of dough. By the structure shown in FIG. 5, the mass of dough can be streched into a web of dough having a predetermined thickness. However, depending on the amount of dough remaining in the hopper 52, or depending on whether the dough is hard or soft, a change inevitably occurs in the volume of dough that passes through the gap between the rollers. If the volume of dough changes, the width of the stretched web 1a of dough cannot be maintained uniform.

The apparatus of FIG. 6 includes two pairs of facing pressure-applying rollers 63, 64 that are located in a vertically-shaped relation. The roller pair 64 rotates at a constant speed to feed the web of dough from the upper roller pair 63 to the following production line, so that a mass of dough is stretched twice. However, because the web of dough is not always delivered from the upper roller pair 63 in a constant volume per unit length, then, for the same reasons as those stated above regarding FIG. 5, if the volume per unit length of dough supplied to the lower roller pair 64 from the upper roller pair 63 is small, the web of dough tends to be severed as shown at point A and B in FIG. 6, while if the volume per unit length of dough supplied to the lower roller pair 64 from the upper roller pair 63 is excessively large, dough tends to accumulate as shown at point C in FIG. 6, thereby resulting in greater fluctuations in the width of the web of dough. Thus, it is impossible to attain the desired stable production.

SUMMARY OF THE INVENTION

One object of this invention is to provide a dough-stretching roller apparatus for delivering a web of dough that has a uniform width and a uniform thickness.

Another object of this invention is to provide a dough-stretching roller apparatus for changing the rotational speed of a roller pair according to the change of the width of dough at the gap of the roller pair to maintain the volume of a web of dough per unit length of dough constant.

By one aspect of this invention a dough-stretching roller apparatus is provided. It comprises a pair of upper rollers that are disposed to define a predetermined gap between them, a hopper located above the upper rollers to supply dough to the gap between the upper rollers, a pair of lower rollers that are located under the upper rollers and that are disposed to define a predetermined gap between them in line with the gap between the upper rollers, motors for separately driving the upper and lower rollers, a sensor means that detects the width of the dough at the gap between the upper rollers, and a controller that controls the motor driving the upper rollers in response to a signal from the sensor means.

In a preferred embodiment of the invention, the sensor means comprises two sensors. One is located on each side of the gap between the upper rollers.

In another preferred embodiment of the invention, the controller decreases the rotational speed of the upper rollers when the sensors detect the width of dough being broader than a predetermined width of the dough passing through the upper rollers, and wherein the controller increases the rotational speed of the upper rollers when the sensors detect the width of dough being narrower than the predetermined width of the dough passing through the upper rollers.

In a further preferred embodiment of the invention, the gap between the lower rollers is narrower than that of the upper rollers.

In a still further preferred embodiment of the invention, the dough-stretching roller apparatus further comprises a controller for controlling the motor driving the lower rollers to control the dough output from the lower rollers.

DESCRIPTION OF THE PREFERRED EMBODIMENT

Figure 1:
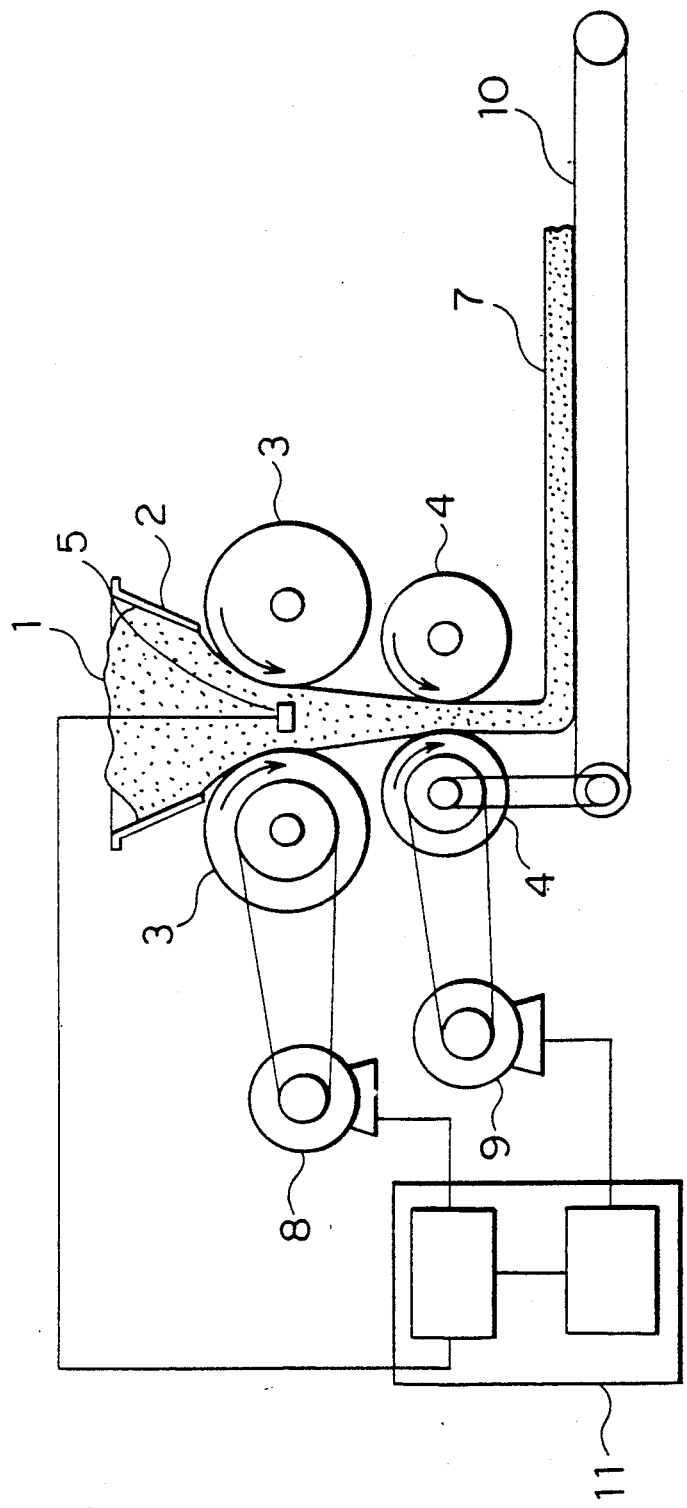
FIG. 1 shows the schematic arrangement of a dough-stretching roller apparatus of an embodiment of the present invention.
Figure 2:
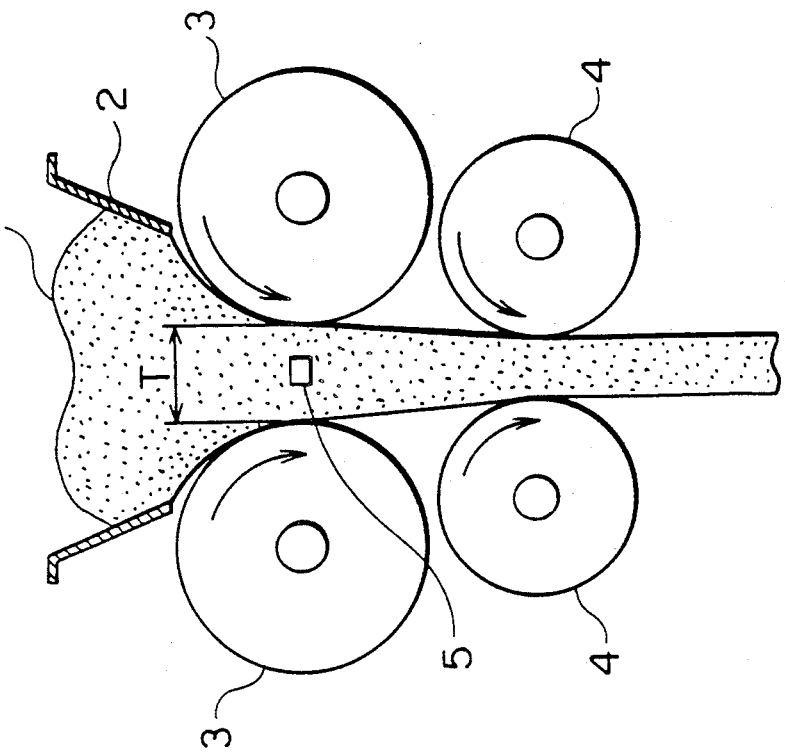
FIG. 2 is a partial and sectional front view of the dough-streching roller aparatus of the embodiment of the present invention.
Figure 3:
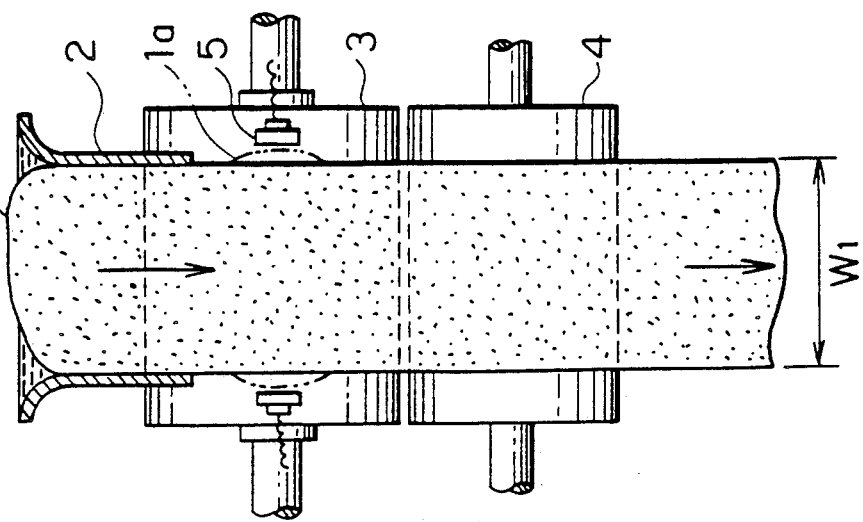
FIG. 3 is a sectional side view of the embodiment of the present invention.
Figure 4:
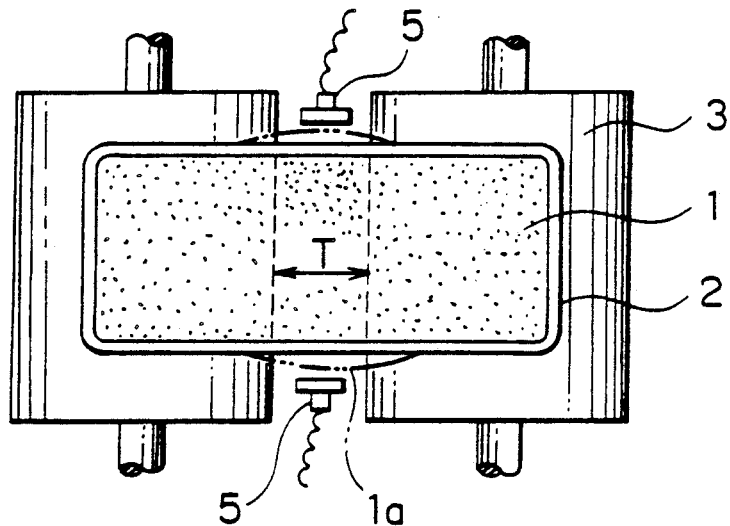
FIG. 4 is a top plan view of the embodiment of the present invention.
Figure 5:
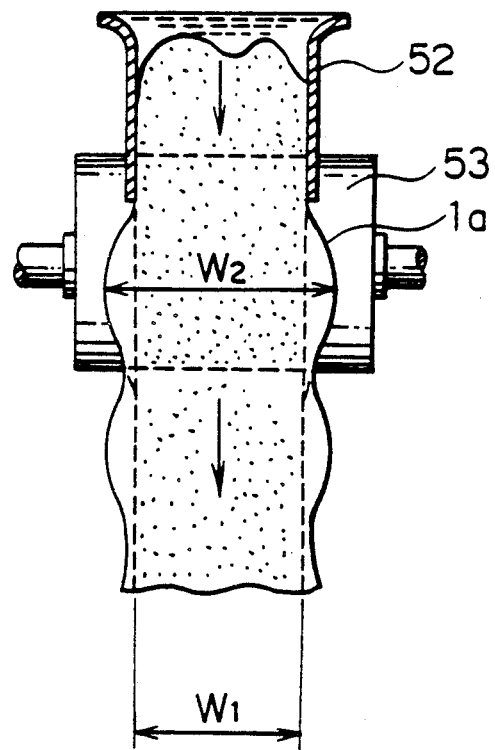
FIGS. 5 and 6 show examples of the prior art.
Figure 6:
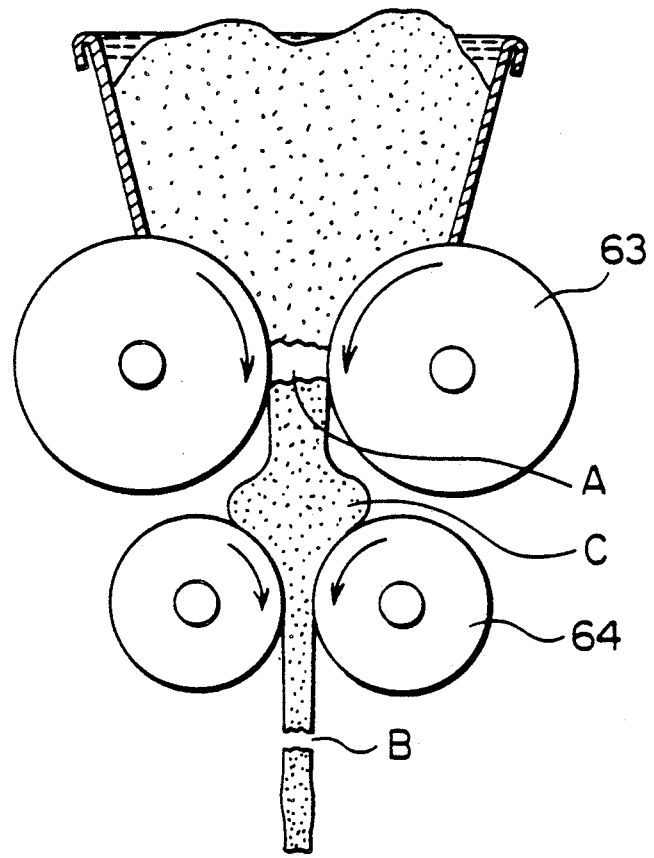

FIGS. 1, 2, 3, and 4 show a dough-stretching roller apparatus of this invention. It includes a hopper 2 to stock a mass of dough 1. A pair of upper cylindrical rollers 3 is located under the hopper 2. The rollers 3 are disposed to define a predetermined distance or gap between them, such as a distance T as shown in FIGS. 2 and 4. The rollers 3 rotate in opposite directions so as to receive a mass of dough 1 stocked in the hopper 2 and to feed it downward.

A pair of lower cylindrical rollers 4 is located under the pair of the upper rollers 3. The rollers 4 are disposed to define a predetermined distance or gap between them in line with the gap between the upper rollers 3. As shown in FIGS. 1, 2, and 4, the gap between the lower rollers 4 is smaller than that between the upper rollers 3. The value of the gap between the lower rollers 4 can be suitably selected.

The lower rollers 4 rotate at a constant speed and uniformly feed the web of dough from the upper rollers 3 to a delivery conveyor 10, so that a stable production of the web of dough is attained. If the rotational speed of the rollers 4 is changed, the rate of production of the stretched web of dough is proportionally changed.

When the rotational speed of the rollers 4 is increased, the stretched web of dough is fed to a delivery conveyor 10 at a higher speed, namely, the rate of production of the stretched web of dough becomes large. When the rotational speed of the rollers 4 is decreased, the stretched web of dough is fed to the delivery conveyor 10 at a lower speed, namely, the rate of production of the stretched web of dough becomes small.

Sensors 5 are located, one on each side of the gap between the upper rollers 3, at positions on a line extending transversely through the center of the gap. The sensors 5 separately detect the distances between them and the marginal edges of a web of dough so as to compute the width of dough passing through the gap between the upper rollers 3.

The upper rollers 3 are driven by a servomotor 8. The rotational speed of the servomotor 8 is controlled by a control signal generated from the controller 11, which calculates the data supplied from the sensors 5 to provide the control signal.

Both the lower rollers 4 and the delivery conveyor 10 are driven by a motor 9. The motor 9 is controlled by a control signal generated from the controller 11 to increase or decrease the production rate of the stretched web 7 of dough. The rotational speed of the lower rollers 4 determines the production rate of the stretched web of dough 7. The delivery conveyor 10 supplies the stretched web 7 of dough to the following production line.

In operation, the upper rollers 3 are rotated at their intitial speed so as to downwardly feed the mass of dough 1 stocked in the hopper 2. By the rotation of the upper rollers 3, the mass of dough 1 is guided toward and into the gap between the rollers, where the mass of dough 1 is compressed and extends in the direction of its width. The sensors 5 detect the distances between them and the marginal edges of a web of dough. The controller 11 calculates the distances supplied from the sensors 5, and obtains the width of dough. The controller 11 compares the calculated width of dough with the predetermined width, and varies the rotational speed of the rollers 3. When, as shown by broken lines 1a in FIGS. 3 and 4, the width of dough is broader than a predetermined width W1 of the dough passing through the upper rollers 3, the controller 11 decreases the rotational speed of the upper rollers 3 proportionally. When the rotational speed of the upper rollers 3 becomes low, the web of dough supplied from the gap between the upper rollers is pulled and stretched by the lower rollers 4, because the rollers 4 rotate at the constant speed. As a result, the width of dough becomes narrow. In contrast, when the width of dough is narrower than the predetermined width W1 of the dough passing through the upper rollers 3, the controller 11 increases the rotational speed of the upper rollers 3 proportionally, so that the width of dough may be broader. As a result, the web of dough 1 can be delivered from the gap with a constant dough width W1.

The web of dough delivered from the upper rollers 3 is further stretched at the gap between the lower rollers 4, and is transferred onto the delivery conveyor 10 to be supplied to the following production line.

The amount of dough 1 supplied into the gap between the upper rollers 3 is not always constant even if the distance of the gap is maintained constant, because of the effect of the amount of dough 1 remaining in the hopper 2 or depending on whether the dough 1 is hard or soft. Also, the variation of the amount of supplied dough 1 results in a corresponding change in the width of the web of dough delivered from the upper rollers 3. Thus, the controller 11 obtains data regarding such a change in the width, and changes the rotational speed of the upper rollers 3 according to such a change in the width, so that the web of dough 1 having a constant volume per unit length of dough can be continuously delivered.

The lower rollers 4 can impart a stable stretching pressure to the web of dough, because they receive from the upper rollers 3 a web of dough having a constant volume per unit length. Thus, even if the amount of dough 1 supplied from the hopper 2 varies, production of the stretched web of dough 1 having a constant volume per unit length can be stably continued.

When the rotational speed of the motor 9 is increased to increase the production rate of the stretched web of dough, the rotational speed of the rollers 4 is increased to accelerate the rate of production of the stretched web of dough. The conveying speed of the delivery conveyor 10 is also synchronously increased to supply the stretched web of dough at a higher speed to the following production line. When the rotational speed of lower rollers 4 is excessively increased, a shortage of dough fed from the upper rollers 3 may result, and the width of the web of dough may decrease. In such a case, the controller 11, responsive to signals from the sensors 5, increases the rotational speed of the upper rollers 3 until the detected width of the web of dough becomes the predetermined width of the web of dough. When the detected width of the web of dough reaches the predetermined width of the web of dough, the increase in the rotational speed of the upper rollers 3 is stopped, and the upper rollers 3 will start to be rotated at a constant speed to continue to supply the web of dough toward the lower rollers 4.

In constrast, when the rotational speed of the rollers 4 is decreased to decelerate the rate of production of the stretched web of dough, the controller 11 detects an increase of the web of dough in its width on the basis of the data from the sensors 5, and supplies a control signal to the motor 9 to decrease the rotational speed of the upper rollers 3, so that an accumulation of dough can be prevented from occurring at the gap between the lower rollers 4.

If the amount of dough stocked in the hopper 2 decreases, the dough delivered from the upper rollers 3 is reduced because the weight of the dough that remains to be deliverered decreases. In such a case, the controller 11 increases the rotational speed of the upper rollers 3 to restore the web of dough from the upper rollers 3.

From the foregoing explanations, it will be understood that the present invention provides a simple and convenient apparatus in which a web of dough having a constant width and a constant thickness can be easily supplied by continuously measuring changes in the width of a web of dough fed from an upper roller pair. That is, the web of dough having a constant volume per unit length can be continuously delivered.

I claim:

1. A dough-stretching roller apparatus comprising a pair of upper rollers that are disposed to define a first gap between them, a hopper located above the upper rollers to supply dough to the first gap between the upper rollers, a pair of lower rollers that are located under the upper rollers and that are disposed to define a second gap between them in line with the first gap between the upper rollers, motors for separately driving the upper and lower rollers, a sensor means that detects a width of the dough in a direction to the axis of rotation of the upper rollers at the first gap between the upper rollers, and a controller that controls the motor driving the upper rollers in response to a signal from the sensor means.

2. The dough-stretching roller apparatus of claim 1, wherein the sensor means comprises two sensors, which sensors are located on both sides of the first gap between the upper rollers.

3. The dough-stretching roller apparatus of claim 1, wherein the controller decreases the rotational speed of the upper rollers when the sensors detect the width of dough being broader than a predetermined width of dough passing through the upper rollers, and wherein the controller increases the rotational speed of the upper rollers when the sensors detect the width of dough being narrower than the predetermined width of dough passing through the upper rollers.

4. The dough-stretching roller apparatus of claim 1, wherein the second gap between the lower rollers is narrower than the first gap between the upper rollers.

5. The dough-stretching roller apparatus of claim 1 further comprising a controller for controlling the motor driving the lower rollers to control the dough output from the lower rollers.

6. The dough stretching rollers apparatus of claim 2, wherein the controller decreases the rotational speed of the upper rollers when the sensors detect the width of dough being broader than a predetermined width of dough passing through the upper rollers, and wherein the controller increases the rotational speed of the upper rollers when the sensors detect the width of dough being narrower than the predetermined width of dough passing through the upper rollers.

* * * * *